R. McMULLEN.

Drill-Jar.

No. 9,072. Reissued Feb. 10, 1880.

WITNESSES:

Jas. E. Hutchinson.

Henry C. Hazard.

INVENTOR.

Robert McMullen

Per Jno. H. Hallock

Atty.

N. PETERS, PHOTO-LITHOGRAPHER, WASHINGTON, D. C.

UNITED STATES PATENT OFFICE.

ROBERT McMULLEN, OF MEADVILLE, PENNSYLVANIA.

DRILL-JAR.

SPECIFICATION forming part of Reissued Letters Patent No. 9,072, dated February 10, 1880.

Original No. 137,378, dated April 1, 1873. Application for Reissue filed January 21, 1880.

*To all whom it may concern:*

Be it known that I, ROBERT McMULLEN, of Meadville, (late of Titusville, Pennsylvania,) in the county of Crawford and State of Pennsylvania, have invented certain new and useful Improvements in Drill-Jars; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to drill-jars; and it consists in improvements in the construction of the same, as will hereinafter appear.

Figure 1:
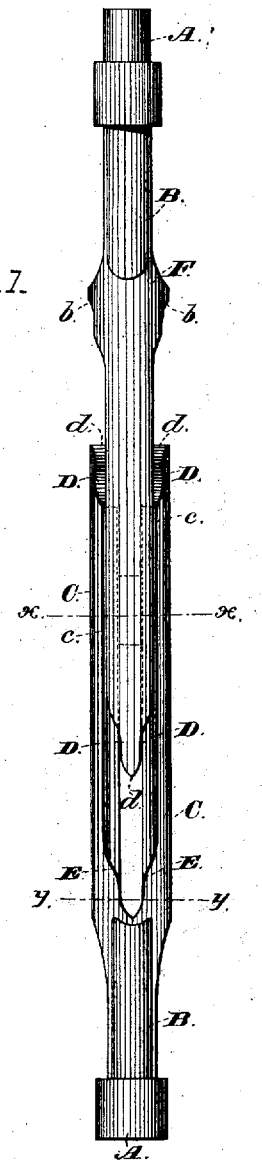
Figure 2:
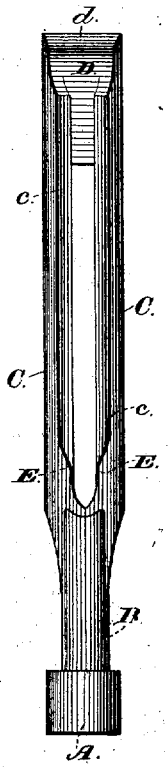
Figure 3:
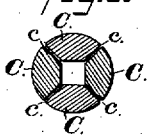
Figure 4:
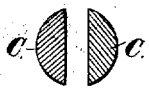

My improved jars are represented in the accompanying drawings, as follows:

Figure 1 is an elevation view, and shows the jars extended nearly to the full extent, as will be seen by dotted lines, which indicate the form within. Fig. 2 is a like view of the lower link with the upper link removed. Fig. 3 is a transverse section on the line *x x* in Fig. 1. Fig. 4 is a like view on the line *y y* in Fig. 1.

My improvement consists, principally, in the form given to the reins of the links and to the inner end pieces.

The objects attained are strength generally throughout the whole construction, and particularly at the points most liable to break, increased weight, and prevention of twisting or kinking by guiding one link upon the other.

A A represent the two parts of the jar. B B are the solid outer ends or the shanks of the links, from which the reins spring, as at *b b*.

C C are the reins or sides of the links, and *c c* are fins or ribs or lateral extensions on the sides of the reins, and which fill up what is an angular space in the ordinary square-bar links.

D D are the inner end pieces of the links, and are made tapering or wedge-shaped, coming to a point on their outer ends, as at *d*.

The reins spring from the shanks B obliquely, and at that point they are essentially half-round in form, as seen at Fig. 4, which is a section on the line *y y*, and the crutch thus formed is wedge-shaped, and corresponds to the shape of the end pieces, D, at *d*, which, when the jar is shoved together, lies in the said wedge-shaped crutch.

I am aware that sector-shaped reins have been heretofore constructed, but they were of that shape throughout their entire length.

By the form given, as shown in the drawings—that is, by having the reins substantially half-round at their spring from the shank and having the crutch wedge-shaped—there is nearly twice the amount of metal in the reins at that part that there is in any other form heretofore made.

I shall, therefore, claim as new the construction of a drilling-jar the reins of which are at a point immediately above their divergence from the shanks, substantially half-round in form, and which, at a point higher up, are of a sector-like form, or a form less than half-round.

The result of this construction is very advantageous, as much of the strain and concussion is delivered at the point of spring of the reins, and this form, in conjunction with the form given to the end pieces, D, as at *d*, produces a most beneficial result, as it gives a great body of metal at the base of the reins to resist the concussion of the blows.

Another advantage of this form is, it compels the links to strike together squarely and always in the same place, thus avoiding twisting, and this, too, even if the reins are made without fins or other lateral extensions to serve as guides.

What I claim is as follows:

1. In drill-jars, a link having its reins springing obliquely from the shank, whereby a wedge-shaped or pointed crutch is formed, in combination with a companion-link having its ends pointed or wedge-shaped to conform to the aforesaid crutch, substantially as and for the purposes mentioned.

2. A drill-jar the links whereof have reins which are substantially half-round at a point immediately above the shanks, but which at points farther removed from the shank are of a sector-like form, substantially as and for the purposes set forth.

3. In drill-jars, a link the reins whereof are substantially half-size at their base, and at points above are of sufficiently less size to admit of the reins of the companion-link lying between them, substantially as shown, and for the purposes mentioned.

In testimony that I claim the foregoing I have hereunto set my hand this 6th day of November, 1879.

ROBERT McMULLEN.

Witnesses:
M. C. POWERS,
R. C. McMULLEN.